UNITED STATES PATENT OFFICE.

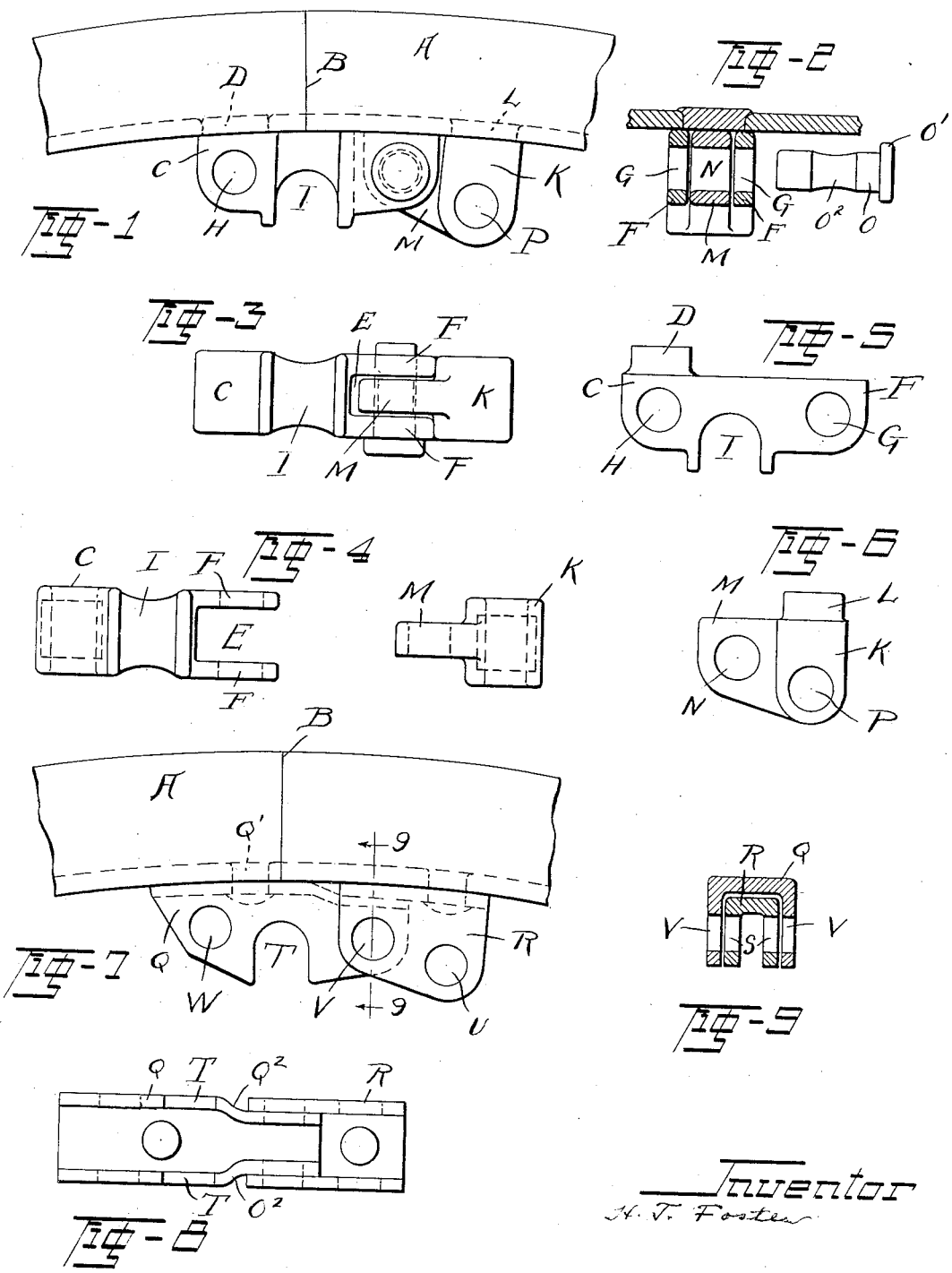

HENRY J. FOSTER, OF CLEVELAND, OHIO, ASSIGNOR TO THE HYDRAULIC PRESSED STEEL COMPANY, OF CLEVELAND, OHIO, A CORPORATION OF OHIO.

RIM-CONNECTING MEANS.

1,412,558.  Specification of Letters Patent.  Patented Apr. 11, 1922.

Application filed June 9, 1919. Serial No. 302,721.

*To all whom it may concern:*

Be it known that I, HENRY J. FOSTER, a citizen of the United States, residing at Cleveland, in the county of Cuyahoga and State of Ohio, have invented a certain new and useful Improvement in Rim-Connecting Means, of which the following is a full, clear, and exact description, reference being had to the accompanying drawings.

This invention relates generally to a one-piece transplit demountable tire carrying rim and more particularly to certain improvements upon my Patents Nos. 1,299,450 and 1,299,451 dated April 8, 1919.

The object of the present invention is to provide simple and inexpensive forms of lugs which serve as operating and driving lugs, and also as means in connection with a locking pin to provide an efficient lock for holding the rim ends against circumferential separation.

Another object of the invention is to provide parts having these characteristic functions which can be made either of drop forging or from pressed sheet metal.

With these objects in view the invention consists in certain novel features of construction and the manner in which they are combined or arranged.

In the drawings forming a part of this specification, Fig. 1 is a side elevation of a portion of a tire carrying rim provided with my novel form of combined operating and locking lugs; Fig. 2 is a detail sectional view on the line 2—2 of Fig. 1, the locking pin being shown removed; Fig. 3 is an inverted plan view of the lugs in locking relation; Fig. 4 is a similar view showing the lugs separated; Fig. 5 is a side elevation of one of the lugs; Fig. 6 is a similar view of the other lug; Fig. 7 is a side elevation showing a portion of the rim with slightly modified form of lugs connected thereto and in locked relation; Fig. 8 is an inverted plan view of the same; and Fig. 9 is a section on the line 9—9 of Fig. 7.

This invention which relates particularly to the lugs is applied to a transplit tire carrying rim A divided at one point B. To one end of the rim is attached the lug C having the outwardly extending rivet D which is adapted to be projected through an opening in the base of the rim and then headed down in order to securely connect the lug C to the rim end and it will be noted that this lug is of such length as to extend beyond the dividing point and beneath the opposed end of the rim.

The free end of the lug C is bifurcated as shown at E providing members F, said members being provided with openings G which register with each other.

The opposite end of the lug C is apertured axially as shown at H and between the apertures H and G the lug is formed with a notch or recess I, this notch or recess being so positioned as to fall in line with the dividing line or split of the rim.

A second lug K has a rivet extension L by means of which it is riveted to the other end of the rim at a point somewhat more remote from the dividing line than the attaching rivet of the lug C. The lug K is provided with a lateral extension M which is apertured as shown at N and this lateral extension M is of such size and shape as to fit between the members F of the bifurcated end of the lug C and the aperture N will register with the apertures in the said members when the ends of the rim are brought into abutment as shown in Fig. 1 and in order to hold the rim ends in such position against circumferential separation I employ a locking pin O having a head O' and a reduced central portion O², the locking pin being inserted when all of the holes are brought into true registry, but the inherent elasticity of the rim will tend to separate the ends just enough to hold the pin securely locked therein. When, however, it is desired to remove the pin, it is only necessary to bring the apertures into true register and the pin can be removed, and the lugs can then be operated upon by the proper tool for the purpose of effecting the circumferential separation and collapsing of the rim, the lug K being formed with an opening P which, in connection with the opening H of the lug C, is adapted to be engaged by the rim operating tool, and it will be noted that the opening P is nearer the center of the rim than the opening H.

When the lugs are engaged by the operating tool, the lug K will serve as a fulcrum for said tool and the rim will be collapsed, the initial movement of the tool serving to circumferentially separate the ends sufficiently to permit the ends of the rim passing each other during the collapsing operation.

The lugs shown and described from Figs. 1 to 6 inclusive are made by drop forging.

In the construction shown in Figs. 7 to 9 the device is made of sheet metal, there being two channel shaped members Q and R, the member Q being riveted to the end of the rim as shown at Q' and projecting beyond the dividing line B of the rim, and this projecting portion has the parallel members thereof pressed together as most clearly shown at Q² in Figs. 8 and 9. The parallel portions of the member Q are apertured as shown at W near one end and also apertured as shown at S near the opposite end and intermediate the ends are notched or recessed as shown at T.

The member R has openings U near one end and also openings V which are adapted to be brought into register with the openings S to receive a locking pin, the opening U being placed nearer the center of the rim than the opening W and adapted to receive one member of the operating tool, the other member of the operating tool being inserted in the openings R and the openings U being nearer the center, are preferably employed as the fulcrum point of the operating tool for the purpose of collapsing and expanding the rim, it being understood that the locking pin is first removed before the rim is collapsed and inserted again after the rim has been expanded in order to hold the rim ends against any possible longitudinal separation when the device is carried demounted as a spare. The recess I in the construction shown in Figs. 1 to 6 is adapted to straddle one of the axial bolts which receives the clamp for fastening the demountable tire carrying rim upon the channeled fixed rim of the wheel body and the recess or notch T in the construction shown in Fig. 7 is for the same purpose thereby providing a driving connection between the demountable and fixed rim. The locking pin O will be the same for either forging or stamping.

By means of the construction herein shown and described it will be seen that I provide simple and inexpensive forms of driving lugs which can be used in connection with an operating tool for the purpose of collapsing or expanding the rim and that in connection with the locking pin the ends of the rim can be securely locked against circumferential separation.

Having thus described my invention, what I claim is:—

1. A transplit tire carrying rim having inwardly projecting lugs, said lugs being constructed for engagement with a tool and so positioned with reference to the split in said rim that the initial movement of the tool will cause a circumferential separation of the ends of the rim, said lugs having interengaging portions and a detachable locking member adapted to be brought into engagement with said interengaging portions of the lugs.

2. A one piece tire carrying rim of the flange type transplit at one point, lugs connected to the ends of said rim, said lugs having openings parallel with the axis of the rim, said openings being adapted to receive members of a lever adapted to turn in a plane transverse to the axis of the rim and whereby the rim will be contracted or returned to its normal diameter, said lugs being formed with interengaging members, and a locking device adapted to be inserted in said interengaging portions of said lugs.

3. A one piece tire carrying rim transplit at one point, a lug connected to one end and extending beyond the dividing point of the rim, said lug having a recess in line with the dividing point of the rim, a second lug attached to the opposite end of the rim, said lugs having interengaging portions, said interengaging portions being apertured, and a locking pin adapted to be inserted in the apertures of said interengaging portions of the lugs.

4. A one-piece tire carrying rim transplit at one point, a lug attached to one end of said rim and projecting beyond said split, said lug having spaced apertures, and a second lug attached adjacent to the opposite end of the rim and also having spaced apertures, and a locking pin adapted to be inserted in the registering apertures of said lugs.

In testimony whereof, I hereunto affix my signature.

HENRY J. FOSTER.